US010824940B1

(12) United States Patent
Rybakov et al.

(10) Patent No.: US 10,824,940 B1
(45) Date of Patent: Nov. 3, 2020

(54) TEMPORAL ENSEMBLE OF MACHINE LEARNING MODELS TRAINED DURING DIFFERENT TIME INTERVALS

(71) Applicant: Amazon Technologies, Inc., Seattle, WA (US)

(72) Inventors: Oleg Rybakov, Seattle, WA (US); Siddharth Singh, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 699 days.

(21) Appl. No.: 15/365,722

(22) Filed: Nov. 30, 2016

(51) Int. Cl.
*G06N 3/08* (2006.01)
*G06N 7/00* (2006.01)
*G06Q 30/06* (2012.01)

(52) U.S. Cl.
CPC ............ *G06N 3/08* (2013.01); *G06N 7/005* (2013.01); *G06Q 30/0631* (2013.01)

(58) Field of Classification Search
CPC ........ G06N 20/00; G06N 20/10; G06N 20/20; G06N 3/08; G06N 7/005; G06Q 30/0631
See application file for complete search history.

(56) References Cited

U.S. PATENT DOCUMENTS

| 7,685,074 | B2 | 3/2010 | Linden |
| 7,765,130 | B2 | 7/2010 | McQueen, III |
| 2007/0011114 | A1 | 1/2007 | Chen et al. |
| 2008/0228680 | A1 | 9/2008 | Chen et al. |
| 2009/0210368 | A1* | 8/2009 | Deo ............... G06K 9/6267 706/20 |
| 2014/0142929 | A1* | 5/2014 | Seide ............... G06N 3/08 704/202 |

(Continued)

FOREIGN PATENT DOCUMENTS

WO          WO 99/45487          9/1999

OTHER PUBLICATIONS

Islam, Md M., Xin Yao, and Kazuyuki Murase. "A constructive algorithm for training cooperative neural network ensembles." IEEE Transactions on neural networks 14.4 (2003): 820-834. (Year: 2003).*

(Continued)

*Primary Examiner* — Kamran Afshar
*Assistant Examiner* — Benjamin J Buss
(74) *Attorney, Agent, or Firm* — Knobbe, Martens, Olson & Bear, LLP (57) ABSTRACT

The present disclosure is directed to training, and providing recommendations via, a temporal ensemble of neural networks. The neural networks in the temporal ensemble can be trained at different times. For example, a neural network can be periodically trained using current item interaction data, for example once per day using purchase histories of users of an electronic commerce system. The item interaction data can be split into a more recent group and a less recent group, for example the last two weeks of data and the remainder of the last two years of data. The periodic training of neural networks, using updated data and the sliding windows created by the date split, results in a number of different models for predicting item interaction events. Using a collection of these neural networks together as a temporal ensemble can increase recommendation accuracy without requiring additional hardware for training.

12 Claims, 5 Drawing Sheets

(56) References Cited

U.S. PATENT DOCUMENTS

| | | | | |
|---|---|---|---|---|
| 2015/0310358 | A1* | 10/2015 | Khabazian | G06Q 30/0201 |
| | | | | 705/7.35 |
| 2016/0066041 | A1* | 3/2016 | Fei | H04N 21/25841 |
| | | | | 725/34 |
| 2016/0086185 | A1* | 3/2016 | Adjaoute | G06Q 40/02 |
| | | | | 705/44 |
| 2016/0103901 | A1* | 4/2016 | Kadav | G06F 16/273 |
| | | | | 707/614 |
| 2016/0350834 | A1* | 12/2016 | Wilson | G06N 3/084 |
| 2017/0039485 | A1* | 2/2017 | Kadav | G06N 20/00 |
| 2018/0069893 | A1* | 3/2018 | Amit | H04L 63/1441 |

OTHER PUBLICATIONS

Islam, Md M., Xin Yao, and Kazuyuki Murase. "A constructive algorithm for training cooperative neural network ensembles." IEEE Transactions on neural networks 14.4 (2003): 820-834. (Year: 2003).*

Hidasi, B., et al., 'Session-Based Recommendations with Recurrent Neural Networks,' published as a conference paper at ICLR 2016, Mar. 29, 2016.

* cited by examiner

TEMPORAL ENSEMBLE OF MACHINE LEARNING MODELS TRAINED DURING DIFFERENT TIME INTERVALS

BACKGROUND

Computer learning models can process large volumes of user and item interaction data to provide relevant recommendations for users. For example, a model may be implemented as an artificial neural network. Artificial neural networks are artificial in the sense that they are computational entities, analogous to biological neural networks in animals, but implemented by computing devices. A neural network typically comprises an input layer, one or more hidden layer(s) and an output layer. The nodes in each layer connect to nodes in the subsequent layer and the strengths of these interconnections are typically learnt from data during the training process. In recommendation systems, such as systems designed to recommend items (e.g., goods and/or services) to users based on the purchase or acquisition histories of the users, neural network models may generate probability scores indicating the probabilities of a user purchasing or otherwise acquiring items during a time period.

The parameters of a neural network can be set in a process referred to as training. For example, a neural network can be trained using training data that includes input data and the correct or preferred output of the model for the corresponding input data. Sets of individual input vectors ("minibatches") may be processed at the same time by using an input matrix instead of a single input vector, which may speed up training. The neural network can repeatedly process the input data, and the parameters (e.g., the weight matrices) of the neural network can be modified in what amounts to a trial-and-error process until the model produces (or "converges" on) the correct or preferred output. The modification of weight values may be performed through a process referred to as "back propagation." Back propagation includes determining the difference between the expected model output and the obtained model output, and then determining how to modify the values of some or all parameters of the model to reduce the difference between the expected model output and the obtained model output.

BRIEF DESCRIPTION OF DRAWINGS

Embodiments of various inventive features will now be described with reference to the following drawings. Throughout the drawings, reference numbers may be re-used to indicate correspondence between referenced elements. The drawings are provided to illustrate example embodiments described herein and are not intended to limit the scope of the disclosure.

DETAILED DESCRIPTION

The present disclosure is directed to generating and using machine learning models, and specifically to a recommendation system that uses a temporal ensemble of a number of artificial neural networks trained using actual purchases of users made in an earlier time period to train the neural network to predict the items actually purchased by such users during a later time period. One way to increase accuracy of neural network predictions is to combine the outputs of a number of different models, referred to as an "ensemble" of neural networks. However, training a neural network is a time-consuming and computationally expensive process, particularly when considering massive training data sets. Traditional neural network ensembles require N times more hardware for training than a single neural network, where N is the number of neural network in an ensemble, thus increasing the cost of training proportionally to the number of neural networks in the ensemble.

In the disclosed system, neural networks are trained at different time intervals using different, but overlapping training datasets, and multiple such neural networks are used in combination to generate recommendations. For example, a neural network can be trained once per day using purchase histories of users of an electronic commerce system. Other examples can implement different training intervals and use different item interaction events for training, for example item page views, web page browsing, digital advertisement selections, adding items to carts to queue them for purchase, adding items to wishlists, and the like. The item interaction data can be split into a more recent group and a less recent group, for example the last two weeks of data and the remainder of the last two years of data. The periodic training of neural networks, using updated user-item interaction data and the sliding windows created by the date split, results in a number of different models for predicting item interaction events. The combination of neural networks can make more accurate predictions (resulting in higher quality recommendations) than each individual neural network.

A neural network temporal ensemble according to the present disclosure collects a number of these neural networks trained at different times and uses them together as an ensemble for generating a prediction or recommendation. Accordingly, the neural networks in the temporal ensemble can be trained at different times, for example using progressively updated data sets with a temporal split to define different groups of input and output training data. As such, a temporal ensemble of neural networks requires fewer processors for training than a conventional ensemble due to training each neural network at a different time, thereby having similar computational and hardware requirements to training a single neural network while providing improvements in accuracy and overfitting robustness compared to a single neural network. In addition, the temporal ensemble can produce a recommendation with accuracy comparable to, or even better than, the accuracy of a neural network ensemble with neural networks trained in parallel while requiring significantly less computing hardware. Such neural network temporal ensembles may be used in a variety of machine learning applications and other systems, including but not limited to: item recommendation generation, automatic speech recognition, facial recognition, handwriting recognition, and image recognition. For example, the neural network temporal ensemble may be used for generating recommendations of items that a user may wish to view, obtain, access, etc. based on the user's prior actions regarding other items.

Some aspects of the present disclosure relate to generating and training a number of temporally distinct neural networks by separating historical item interaction data into both inputs and outputs. This may be done, for example, based on date. For example, item interaction events prior to a given date can be treated as inputs and item interaction events after that date can be treated as outputs. Different data split dates (or times) can be used for training different neural networks within an ensemble. For example, the data split date can be two weeks prior to the date of training the neural network, so that neural networks trained on different dates have different timeframe ranges for the expected output group. As a result, a given purchase by a user may form part of the input set for training one neural network in the ensemble, but may form part of the output data set for training another neural network in the ensemble.

According to some aspects, a neural network of a particular topology can be trained intermittently and/or periodically based on updated historical item interaction data. Each time a neural network is trained, a sliding window of a less recent group of item interaction events can be used as the input and a sliding window of a more recent group of item interaction events can be used as the expected output. A newly trained neural network can be stored for use in combination with some or all previously-trained neural networks as a neural network temporal ensemble. For example, the ensemble used to generate item recommendations may be formed from the N most recently trained neural networks (where N is an integer such as 2, 3, 4, or 5), each trained with a different window of purchase history data and with a different split date. The neural networks in a temporal ensemble can have the same or different neural network topologies. The outputs of the neural networks can be given the same weight, or can be subject to a time decay such that more recently trained neural networks are given more weight than neural networks trained a longer time ago.

Further aspects of the present disclosure relate to methods of using an ensemble of trained neural networks to generate output. For example, the training data used to train the neural network may be collected from a large number of users, but to generate a prediction, the item interaction event history of a single user can be run through the neural network to get personalized item event predictions. In some embodiments, elements of the input vector of a user can correspond to items with 1 representing that the user has purchased an item during a time period, and 0 representing that the user has not purchased the item during the time period, and to attributes with 1 representing that an item purchased during the time period has the attribute, and 0 representing that no item purchased during the time period has the attribute. An element of the output vector can be a predicted probability of the user purchasing the item during a subsequent time period. For example, if the probability has a value greater than 0.5, then the user has a high probability of purchasing the item in the subsequent time period. Such an item can be recommended to the user. The outputs of the neural networks in the temporal ensembles can be combined in order to provide a single probability for each output event from the number of neural networks in the ensemble. The probability can represent the likelihood that a second event will occur concurrently with a first event. As used herein, concurrently can refer to the first and second events occurring (1) during the same purchase order in an electronic marketplace, (2) during the same browsing session in a digital content environment, or (3) as actions performed by the same user within a predefined time interval or predefined set of related behaviors.

Neural networks, including but not limited to deep neural networks ("DNNs"), typically have multiple layers of nodes. Illustratively, a neural network may include an input layer, and output layer, and any number of intermediate, internal, or "hidden" layers between the input and output layers. The first layer (referred to as the "input layer" herein) has input nodes which send data via synapses to the second layer of nodes, and then via more synapses to the third layer of output nodes. Some systems can have more layers of nodes, some having increased layers of input nodes and output nodes. Each hidden layer can transform the input data and output the transformed data for use by a subsequent layer. Activation functions and patterns in hidden layers can be considered as an encoding of how the network is programmed to identify significant features of the inputs. The individual layers may include any number of separate nodes. Each node can be considered as a computer-implemented simulation of a biological neuron and represents a connection between the output of one node to the input of another. Each node can be connected with many others by synapses, and links can be enforcing or inhibitory in their effect on the activation state of connected nodes. Each individual node may have a summation function which combines the values of all its inputs together, a threshold function, and/or limiting function on each connection and on the node itself such that it must surpass it before it can propagate to other neurons. Synapses may store parameters called weights that can manipulate the data in the calculations. Nodes of adjacent layers may be logically connected to each other, and each logical connection between the various nodes of adjacent layers may be associated with a respective weight. A node may be thought of as a computational unit that computes an output value as a function of a plurality of different input values. Nodes may be considered to be "connected" when the input values to the function associated with a current node include the output of functions associated with nodes in a previous layer, multiplied by weights associated with the individual "connections" between the current node and the nodes in the previous layer.

When a neural network is used to process input data in the form of a matrix of input vectors (e.g., a batch of training data input vectors), the neural network may perform a "forward pass" to generate a matrix of output vectors. The input vectors may each include n separate data elements or "dimensions," corresponding to the n nodes of the neural network input layer (where n is some positive integer). Each data element may be a value, such as a floating point number or integer. The forward pass includes multiplying the matrix of input vectors by a matrix representing the weights associated with connections between the nodes of the input layer and nodes of the next layer, and applying an activation function to the results. The process is then repeated for each subsequent neural network layer.

Some neural networks have thousands of nodes, and millions of weights for connections between the nodes of all of the adjacent layers. Such neural networks may consume a large amount of space when stored, a large amount of bandwidth when transmitted, a large amount of memory when trained, and a large amount of processing resources when used due to the large number of calculations to be performed. In some cases, a neural network may be so large that it cannot practically be implemented with a single processor (e.g., it may require more memory than is available to a single processor). For example, if the input layer and the output layer have more than 2,000,000 nodes and each of two internal layers has 1,024 nodes, then the neural network may not be practically implemented with a processor with 12 gigabytes ("GB") of memory. The neural network would then typically be split up and distributed among multiple processors. Generating a conventional ensemble of such distributed neural networks, for example by training a number of neural networks in parallel using randomized initialization parameters, introduces additional complexities in terms of the hardware and software required to train and use the neural networks. Such complexities are reduced, at least in part, by the temporal ensembles described herein.

Although discussed within the context of neural networks, it will be appreciated that the temporal ensemble concepts described herein could be applied to other classifications including random forests to train a number of decision trees, semi-supervised expectation maximization functions, and other suitable machine learning models.

Various aspects of the disclosure will now be described with regard to certain examples and embodiments, which are intended to illustrate but not limit the disclosure. Although the examples and embodiments described herein will focus, for the purpose of illustration, specific calculations and algorithms, one of skill in the art will appreciate the examples are illustrate only, and are not intended to be limiting.

Example Recommendations System

Figure 1:
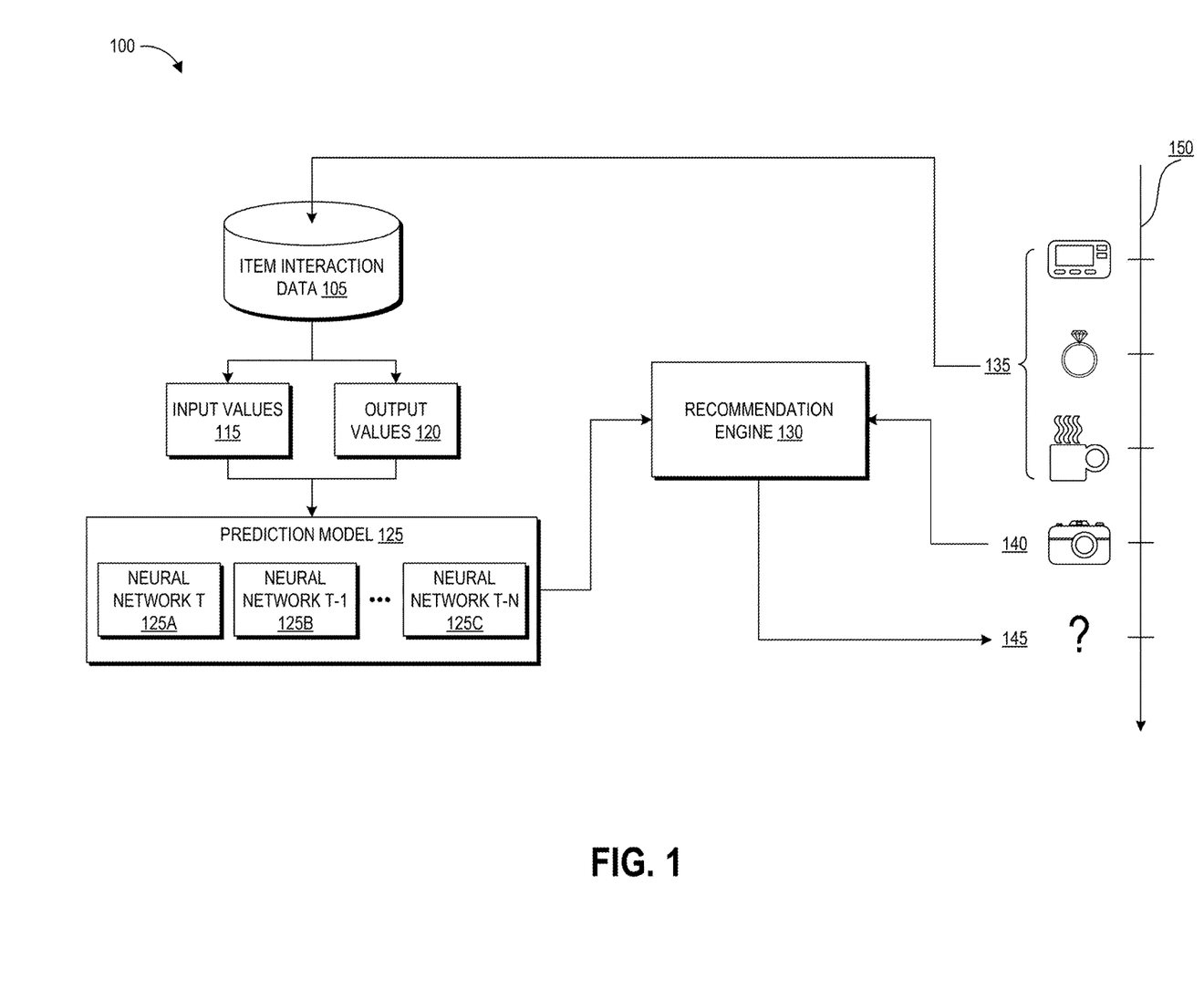
FIG. 1 depicts an illustrative example of data flow within a recommendation system that may be implemented in accordance with at least some embodiments.

FIG. 1 depicts an illustrative example of data flow within a recommendation system that may be implemented in accordance with at least some embodiments. In FIG. 1, a recommendation system 100 may include computer executable instructions that that implement one or more machine learning techniques to create a prediction model 125 that may be used to predict item interaction events based on item interaction data repository 105.

Item interaction data repository 105 can include logged user behaviors with respect to items within a network environment. As used herein, an item can be a physical or digital product or service in an electronic marketplace ecommerce system, and outside of the ecommerce context an item can be a network page or web site visited by a user, a digital advertisement selected by a user, or other types of interactive digital content. An item interaction event may be any logged user behavior or event in which an item is consumed (for example, purchased, viewed, used, clicked on, interacted with, etc.). As used herein, a purchase refers to exchange of money, gift card funds, or credits for the permanent purchase or temporary rental of any physical or digital item. Item interaction data repository 105, for example in the ecommerce context, can include item purchase histories, item viewing histories, item add histories (for example adding an item to a cart without subsequently purchasing the item or adding the item to a wish list), item sharing, item ratings, and the like. Item interaction data repository 105 can additionally or alternatively include item viewing events and user browsing histories. In some embodiments, an item interaction event may include an identifier for the item (for example, an item number, stock keeping unit (SKU), etc.), a date of the consumption event, an indication of the type of consumption, or any other suitable information.

The recommendation system 100 may receive an indication of user-specific item interaction events 135 (e.g., item interaction events that are each associated with a single user). Each of the user-specific item interaction events 135 may be stored in, and maintained by, the item interaction data repository 105 with respect to a timeline 150. For example, each item interaction event in item interaction data repository 105 may be associated with a timestamp or other suitable date/time indicator. The item interaction data repository 105 can include item interaction events associated with a number of users (for example, a consumer base for an electronic retailer).

The item interaction data repository 105 can be split into input values 115 and output values 120 for training a prediction model. The split can be a temporal split having two temporally non-overlapping ranges by assigning a more recent subset of the item interaction data repository 105 to the output values 120 and a less recent subset of the item interaction data repository 105 to the input values 115. For example, data can be split so that the input values include item interaction events within the last two years except for the last two weeks, and the output values can include the item interaction events within the last two weeks. Other data splits can include one year/one month, all history/one week, or other temporal splits based on the desired results. Due to this temporal data split, the input values 115 at time T (at which neural network T is trained) will vary from the input values at time T−1 (at which previous neural network T−1) as the less recent data window shifts to cover different events in the item interaction data repository 105. Similarly, the output values 130 at time T will vary from the output values at time T−1 as the more recent data window shifts to cover different events in the item interaction data repository 105. In some embodiments, item interaction data repository 105 can include purchase histories of a number of users of an electronic catalog. When training a particular neural network using a particular split date, some embodiments can only use purchase histories of users who have purchased some threshold number of items after the split date and some threshold number of items before the split date.

Prediction model 125 can be a temporal ensemble of neural networks generated from various sets of the input values 115 and output values 120. In one example, an artificial neural network machine learning technique may be used to generate the prediction model 125 by training a neural network with the input values 115 provided to an input layer and providing output values 120 to an output layer. The neural networks of the prediction model 125 may each include a number of connections between the hidden layers and the input layer and/or output layer, each of which may be assigned a numeric weight generated based on a pattern identified between the set of input values 115 and the set of output values 120.

Prediction model 125 can include a temporal ensemble of a number of neural networks T, T−1, T−N as shown. As will be appreciated, neural networks T, T−1, and T−N represent neural networks trained at different points in time T, T−1, and T−N. Due to the sliding window of temporal data split applied as described above, each of neural networks T, T−1, and T−N is trained using different sets of data. Different date splits are used for different neural networks, such that the purchase history of a given user may be used differently to train different neural networks in the ensemble. For example, a given purchase of a user may fall before the split date for one neural network but after the split date for another, and may therefore be included in the input set for training one neural network but the output data set for the other neural network. Two or more neural networks can be used by the temporal ensemble. Other examples can use a temporal ensemble of another type of prediction model suitable for generating a recommendation from provided data. A prediction model may use any suitable system capable of receiving input, identifying patterns within the input data, and providing a prediction based on the identified patterns. For example, a prediction model may include a decision tree, a semi-supervised expectation maximization function, or another type of suitable machine learning function or algorithm.

Once a prediction model 125 has been generated, it may be used to predict one or more future item interaction events. In some embodiments, the prediction model 125 can be used to generate recommendations "offline," that is, prior to the recommendations being requested for presentation to a user. The recommendations can be generated periodically and then stored for future use. In some embodiments the recommendation engine 130 can generate recommendations in "real time," that is, as a user is interacting with a system and the interactions trigger requests for recommendations. Some embodiments can use a combination of these offline and real time recommendations.

To illustrate, information about an item 140 can be provided to the recommendation engine 130 and input into the prediction model 125 to generate a prediction 145. The prediction 145 can include a recommended item that generally users can be expected to interact with based on also interacting with the item 140. In some implementations, a list of a number of available items can be run through the prediction model 125 to generate a number of item-recommended item pairings. Associations are created in computer storage between particular items and one or more recommended items. These pairings can be stored for presenting recommendations to users who interact with identified items. In some implementations, item interaction events associated with a particular user can be retrieved from the item interaction data repository 105 and input into the prediction model 125 together with item 140 to generate a user-specific prediction 145. Such prediction can include one or more item interaction events that the user is predicted to initiate based on the user-specific data and the interaction with the item 140. The prediction 145 can be presented to the user in some embodiments. For example, if an ensemble includes five neural networks and three of them predict that a user will purchase item A, item A can appear in a set of items recommended to the user.

Example Artificial Neural Networks

Figure 2:
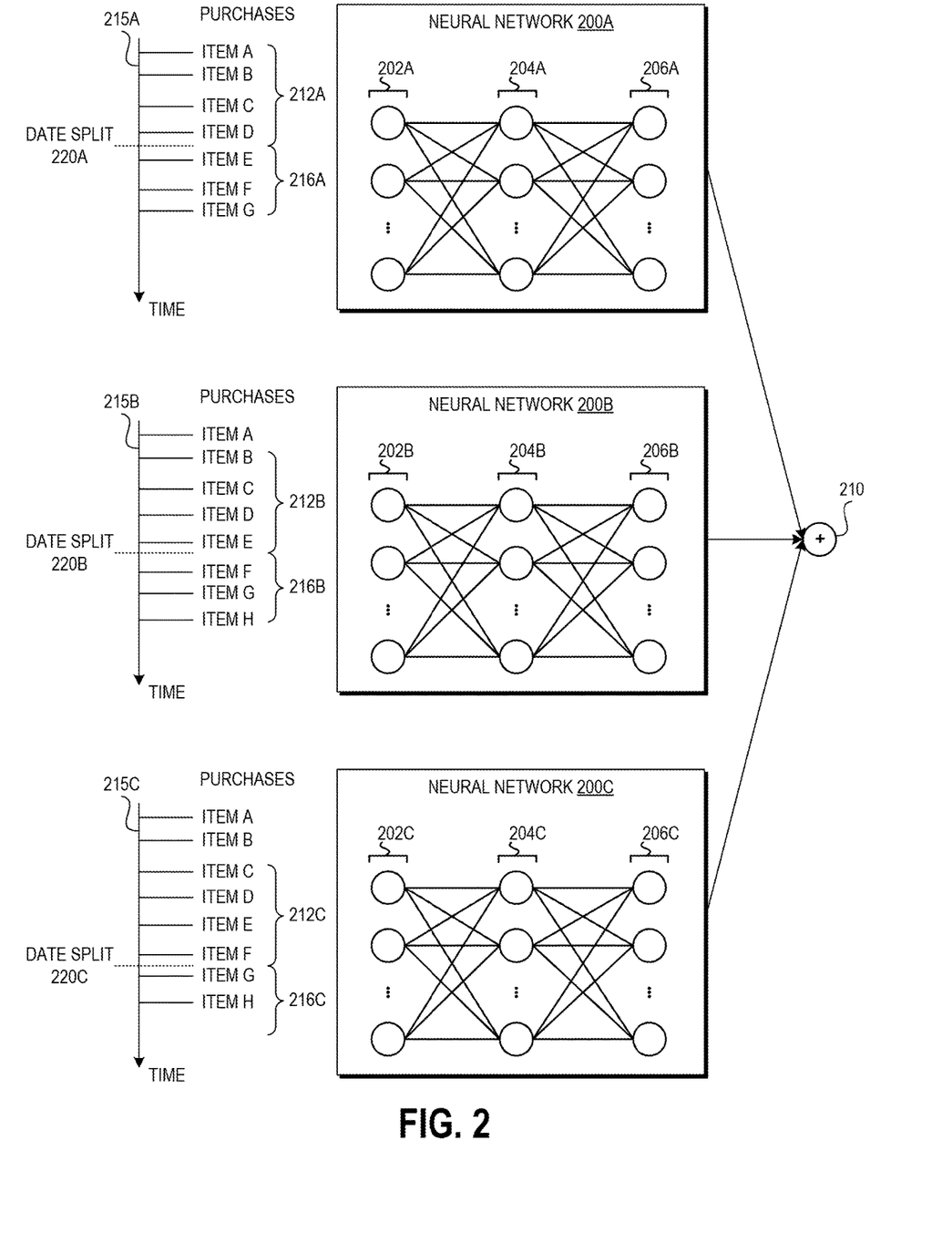
FIG. 2 depicts an example temporal ensemble of neural networks each having a timeline and data split for generating a set of inputs and a set of outputs for training the neural network.

FIG. 2 depicts an example temporal ensemble of three neural networks 200A, 200B, 200C each having a timeline 215A, 215B, 215C and date split 220A, 220B, 220C for generating a set of inputs and a set of outputs for training the neural network. The neural networks 200A, 200B, 200C can be feedforward artificial neural networks, for example multilayer perceptrons, in some implementations. As will be appreciated, the depiction of three neural networks is for purposes of example, and the disclosed temporal ensemble can include any number of two or more neural networks trained using temporally distinct data sets.

An artificial neural network 200A, 200B, 200C represents a network of interconnected nodes, similar to a biological neural network, where knowledge about the nodes is shared across output nodes and knowledge specific to each output node is retained. Each node represents a piece of information. Knowledge can be exchanged through node-to-node interconnections and node-to-task connections. Input to the artificial neural network 200A, 200B, 200C activates a set of nodes. In turn, this set of node activates other nodes, thereby propagating knowledge about the input. At each set of nodes, transformative functions may be applied to the data. This activation process is repeated across other nodes until an output node is selected and activated.

As shown, each neural network 200A, 200B, 200C has an input layer 202A, 202B, 202C with a number of nodes, a hidden layer 204A, 204B, 204C with a number of nodes, and an output layer 206A, 206B, 206C with a number of nodes. The specific number of layers and number of nodes per layer shown in FIG. 2 are illustrative only, and are not intended to be limiting. In some embodiments the number of nodes in input layers 202A, 202B, 202C may differ from one another based on the dimensionality of the input data set, and similarly the number of nodes in output layers 206A, 206B, 206C may vary based on the dimensionality of the output data set. The number of nodes in the hidden layers 204A, 204B, 204C can be the same as one another. In some neural networks, different numbers of internal layers and/or different numbers of nodes in the input, hidden, and/or output layers may be used. For example, in some neural networks the layers may have hundreds, thousands, or even millions of nodes based on the number of data points in the input and/or output training data. As another example, although only one hidden layer is shown, in some neural networks there may be 2, 4, 5, 10, or more internal layers. In some implementations, each layer may have the same number or different numbers of nodes. For example, the input layer or the output layer can each include more nodes than the hidden layer. The input layer and the output layer can include the same number or different number of nodes. The input vectors, or the output vectors, used to train the neural network may each include n separate data elements or "dimensions," corresponding to the n nodes of the neural network input layer (where n is some positive integer).

The nodes of the hidden layer are interconnected to the nodes of the input layer on one side and are connected to the nodes of the output layer on the other side. If multiple hidden layers exist, the input nodes are interconnected to hidden nodes of the closest hidden layer only. In turn, these hidden nodes are interconnected to the hidden nodes of the next hidden layer and so on and so forth. An interconnection may represent a piece of information learned about the two interconnected nodes. In comparison a connection between a hidden node and an output node may represent a piece of information learned that is specific to the output node. The interconnection may be assigned a numeric weight that can be tuned (e.g., based on a training dataset), rendering the artificial neural network 200A, 200B, 200C adaptive to inputs and capable of learning.

Generally, the hidden layer 204A, 204B, 204C allows knowledge about the input nodes of the input layer 202A, 202B, 202C to be shared amongst the output nodes of the output layer 206A, 206B, 206C. To do so, an activation function $f$ is applied to the input nodes through the hidden layer. In an example, the activation function $f$ may be non-linear. Different non-linear activation functions $f$ are available including, for instance, a rectifier function $f(x)=\max(0, x)$. In an example, a particular non-linear activation function $f$ is selected based on cross-validation. For example, given known example pairs $(x, y)$, where $x \in X$ and $y \in Y$, a function $f\ X \rightarrow Y$ is selected when such a function results in the best matches (e.g., the best representations of actual correlation data).

The artificial neural network 200A, 200B, 200C may also use a cost function to find an optimal solution (e.g., an optimal activation function). The optimal solution represents the situation where no solution has a cost less than the cost of the optimal solution. In an example, the cost function includes a mean-squared error function that minimizes the average squared error between an output $f(x)$ and a target value y over the example pairs $(x, y)$. In some embodiments, a backpropagation algorithm that uses gradient descent to minimize the cost function may be used to train the artificial neural network 200A, 200B, 200C. In some embodiments, the artificial neural network 200A, 200B, 200C may be an autoencoder neural network, in which both inputs and outputs are provided to the artificial neural network during training and the autoencoder learns to reconstruct its inputs.

The input layer 202A, 202B, 202C includes a set of nodes that are referred to herein as input nodes. Each of these input nodes may be mapped to a particular item interaction event in a sliding window of less recent item interaction events. The output layer 206A, 206B, 206C includes a set of nodes that are referred to herein as output nodes. Each of these output nodes may be mapped to a particular item interaction event in a sliding window of more recent item interaction events.

To illustrate, consider the illustrated example where the timelines 215A, 215B, 215C illustrate purchases of various items over time. Neural network 200A can be trained by mapping the less recent window 212A including items A, B, C, and D purchased before the date split 220A to the input nodes 202A and by mapping the more recent window 216A including items E, F, and G purchased after the date split 220A to the output nodes 206A. Neural network 200B can be trained by mapping the less recent window 212B including items B, C, D, and E purchased before the date split 220B to the input nodes 202B and by mapping the more recent window 216B including items F, G, and H purchased after the date split 220B to the output nodes 206B. Neural network 200C can be trained by mapping the less recent window 212C including items C, D, E, and F purchased before the date split 220C to the input nodes 202C and by mapping the more recent window 216C including items G and H purchased after the date split 220C to the output nodes 206C. Thus, although there were no new purchases between the timelines 215B and 215C, because of the sliding date splits the training data differs for neural networks 200B, 200C. As such, in the example of a temporal ensemble trained daily using purchase histories of large numbers of users, even if a particular user has not purchased anything in the last several days his or her recommendations will typically be different every day.

In the depicted temporal ensemble, a prediction model may be generated such that the hidden layers 204A, 204B, 204C retain information (e.g., specific variable values and/or transformative functions) for a set of input values and output values used to train the artificial neural networks 200A, 200B, 200C in the temporal ensemble. This retained information may be applied to a set of user-specific input values in order to determine likely output values. As shown, in some embodiments the temporal ensemble of neural networks 200A, 200B, 200C may be used to generate a prediction model using inputs that include item interaction events from a plurality of users that occurred before a specified date 220A, 220B, 220C and outputs that include item interaction events from the plurality of users that occurred after that date 220A, 220B, 220C (as well as weighted item interaction events occurring before the date). In this example, the resulting prediction model may be applied to a user's past item interaction events to predict the user's likely future item interaction events. The outputs of the neural networks 200A, 200B, 200C can be combined to generate a single recommendation 210. For example, the outputs can be numerical scores representing a likelihood of item-recommended item pair interactions. These scores can be combined, for example summed or averaged optionally after being weighted so that scores from more recently trained models are weighted more heavily than scores from less recently trained models, to generate the recommendation 210.

Figure 3A:
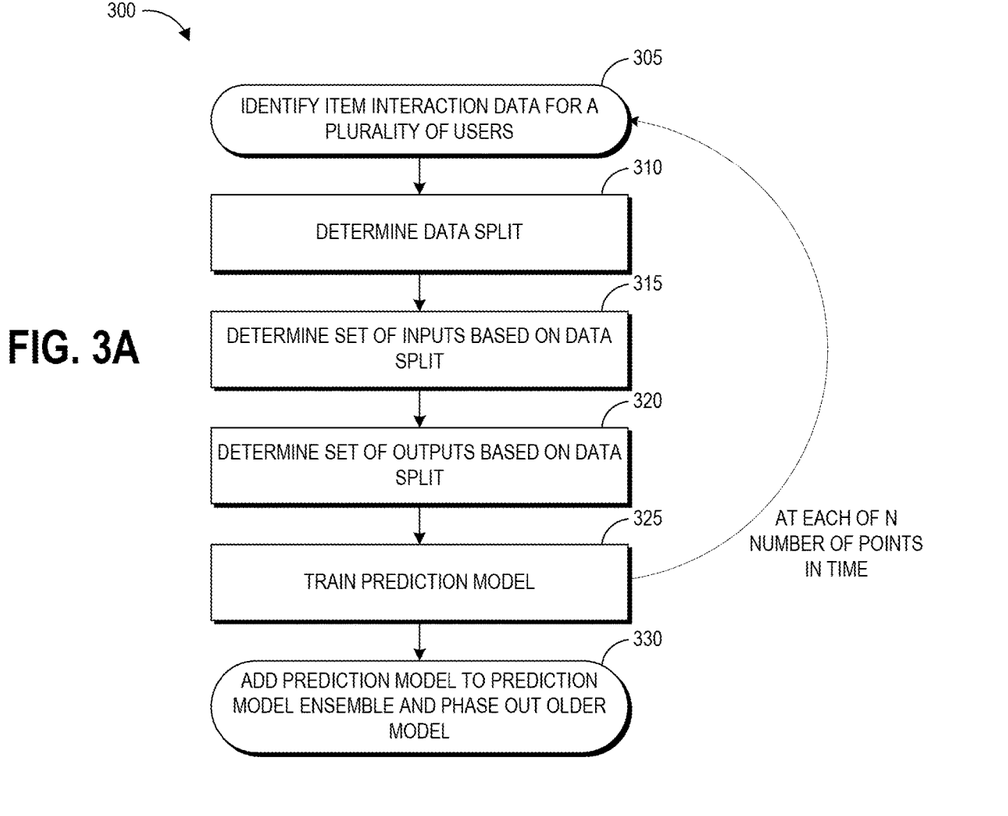
FIGS. 3A AND 3B depict a flow diagram of an illustrative process for providing user-specific item interaction event predictions via a temporal ensemble of neural networks.
Figure 3B:
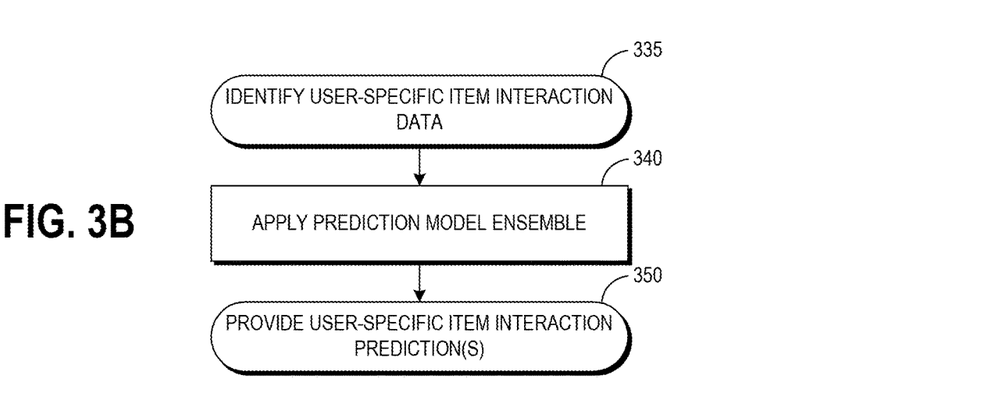

Example Process for Generating a Recommendation Via a Temporal Ensemble of Neural Networks FIGS. 3A AND 3B depict a flow diagram of an illustrative process 300 for providing user-specific item interaction event predictions via a temporal ensemble of neural networks. FIG. 3A depicts a portion of the process 300 relating to training of a temporal ensemble and FIG. 3B depicts a portion of the process 300 relating to using the temporal ensemble to generate a recommendation. Some or all of the process 300 (or any other processes described herein, or variations, and/or combinations thereof) may be performed under the control of one or more computer systems configured with executable instructions and may be implemented as code (e.g., executable instructions, one or more computer programs, or one or more applications) executing collectively on one or more processors, by hardware or combinations thereof. For example, the process 300 may be performed by the service provider 500 of FIG. 5. The code may be stored on a computer-readable storage medium, for example, in the form of a computer program comprising a plurality of instructions executable by one or more processors. The computer-readable storage medium may be non-transitory.

At block 305 the process can identify item interaction data for a plurality of users. For example, in some embodiments, the plurality of users may be users of an electronic marketplace and item interaction events may comprise purchase transactions for a number of items provided by the electronic marketplace. In this example, historical item purchase data may be used to periodically train a prediction model using one or more machine learning techniques.

At block 310, the process 300 can determine a data split to be used in identifying a set of input values and a set of output values from the item interaction data. In some embodiments, the data split may be a date threshold. A date threshold may be a set date (for example, Jan. 1, 2016), a floating date (for example, the date exactly one week prior), or any other suitable type of date threshold. Some embodiments may set a near date threshold and a far date threshold, for example two weeks prior and two years prior, in order to identify a more recent group of the item interaction data as the expected output values and a less recent group of the item interaction data as the input values.

At block 315, the process 300 can determine a set of input values based on the data split. In some embodiments, all item interaction events on one side of the data split (for example, occurring before a date threshold) may be included in an input set. In some embodiments, a time-decay function may be used to weight item interaction events within the set of inputs (and/or outputs in some embodiments) to give progressively less weight to progressively older purchases. For example, item interaction events that have occurred more recently may be given greater weight than item interaction events that occurred further in the past. In some embodiments, only item interaction events that have occurred within a predetermined period of time may be included in a set of inputs.

At block 320, the process 300 can determine a set of output values based on the data split. In some embodiments, all item interaction events on the opposite side of the data split (for example, occurring after a date threshold) from the input set can be included in an output set. In some implementations the output data can be weighted according to a time-decay function, for example by weighting events in proportion to an amount of time that has elapsed since the occurrence of that item interaction event or according to a time-decay function.

At block 325, the process 300 can train a prediction model based on the determined set of input value and the determined set of output values. In some embodiments, the set of inputs and the set of outputs may be used to train a machine learning technique, for example a neural network. For example, the set of inputs and the set of outputs may be input to an autoencoder neural network machine, which will learn patterns and/or correlations between each of the inputs and each of the outputs using one or more cost functions.

The process 300 can repeat blocks 305 to 325 to generate a number of temporally separated prediction models. At block 330, once a new prediction model (for example, a neural network) has been trained, it may be added to the ensemble or group of previously trained prediction models, and an older prediction model (for example, a model trained greater than a threshold period of time prior to the training of the new model, or the least recent model in the group) in the ensemble may be phased out. In some embodiments, blocks 305 to 325 can be repeated after a predetermined lapse of time, for example once per day, once per week, or once per a different time interval depending on the needs of the recommendation system. In some embodiments, blocks 305 to 325 can be performed at regular or irregular intervals based on an update function, for example a function identifying when a threshold amount of change has occurred between a current item interaction data set and the last item interaction data set used to train a prediction model. Each prediction model can be stored, for example in the trained models data repository 526 of FIG. 5. The models can be stored indefinitely, for a predetermined time period, or until a threshold number of models have been stored.

In some embodiments, blocks 305 to 325 can be performed separately for items in each of a number of categories to generate category-specific prediction models. Item categories for items in an electronic catalog can include, by way of example and not limitation, apparel, groceries, electronics, home décor, and the like. Item interaction data can be partitioned by category and separately processed through blocks 305 to 325 to generate category-specific prediction models.

At block 335, the process 300 can identify user-specific item interaction data. For example, the process 300 can identify a purchase history or other set of user-item interaction events associated with a particular user. Some embodiments may use all events associated with the user or just a predetermined timeframe of the events, for example a most recent two years or two weeks of events. In this example, information on user-specific item interaction events may be queried from a data store, for example a purchase history associated with that particular user. For example, the ensemble may generate recommendations for the user based on the user's last N purchases (or based on some other input set of items, such as the items in the user's shopping cart, or the last N items viewed by the user). In some embodiments, user-specific item interaction event information may be stored in association with a user account maintained by a service provider computer.

At block 340, the process 300 can apply a temporal ensemble including a number of the temporally-separated prediction models to input data to generate a recommendation. For example, some embodiments can apply eight of the most recently trained models in the trained models data repository 526. Other embodiments can apply greater or fewer than eight models, for example two, four, ten, or more models. The process 300 can apply the generated prediction models to the user-specific item interaction data to generate user-specific item interaction predictions. For example, information related to user-specific item interaction events may be included in a second set of inputs. The second set of inputs may then be provided to each generated prediction model in the ensemble to identify a set of output scores representing item interaction events. In some embodiments this can be done in parallel such that each neural network in the ensemble is provided with the second set of inputs at approximately the same time. The output scores represent the likelihood that the user is interested in (e.g., likely to conduct) these item interaction events, for example likely to purchase item B after having purchased item A. The outputs of the models can be combined—for example summed, averaged, weighted, or otherwise combined into a single score—to provide a single recommendation using the temporal ensemble. After combination, the scores can be ranked or sorted to generate a ranked list of events.

At block 345, the process 300 can provide user-specific item interaction predictions to a requesting entity. In some embodiments, the process 300 can provide the user-specific item interaction predictions to another module or application. For example, the item interaction predictions may be used by a targeted advertisement provider to provide advertisements to that user that are likely to be effective. In another example, the item interaction predictions may be used within an electronic marketplace to recommend products to the user that he or she is likely to be interested in. In some embodiments the recommendations can be precomputed and stored for future use.

In some embodiments, block 335 can be performed offline, that is, prior to a user interacting with the catalog. Such recommendations can be precomputed and presented to the user for example upon first viewing the electronic catalog, via a recommendations message, or at another point during or outside of user interaction with the catalog. Block 335 can be triggered in some embodiments by detecting a user-item interaction event with an item, for example a newly purchased item or an item on a page currently selected by a user for viewing. One or more recommended items can be determined via blocks 335-345 and presented to the user, for example in a recommendations area of the item page. In other embodiments blocks 335-345 can be precomputed per user across a range of available items and stored as an item-recommended item mapping for each user. In such embodiments, upon detecting a user-item interaction event with an item the process 300 can look up one or more recommended items mapped to the item and present the recommendation(s) to the user. For example, a current selection of available items may be included in a second set of inputs into the temporal ensemble to generate a probability distribution of a given user interacting with each other item after interacting with an item. The other items can be ranked according to their output scores, and a predetermined number of items and/or a number of items having output scores above a threshold can be stored as recommended items for an item.

Figure 4:
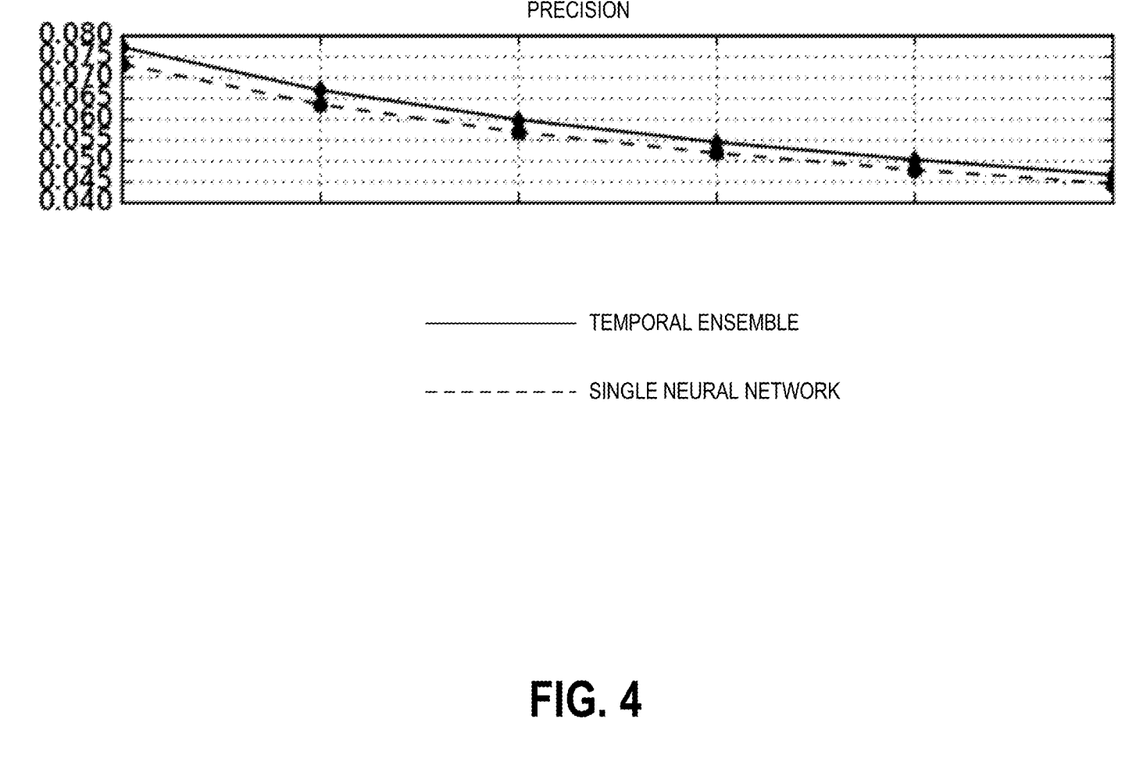
FIG. 4 depicts an example technical advantage that may be achieved in accordance with embodiments of the disclosure.

FIG. 4 depicts an example technical advantage that may be achieved in accordance with embodiments of the disclosure. The accuracy of a temporal ensemble approach is shown by the solid line, and the dashed lines represent the accuracy of single-model approaches. With respect to recommendation systems, the term "precision" may refer to a proportion of the top X item interaction events that are relevant (for example, item interaction events that belong to an appropriate item interaction event category), where X is some predicted number of item interaction events. For example, precision may refer to the number of relevant item interaction events returned divided by the total number of item interaction events returned. As evident from FIG. 4, precision is improved by 0.5% (absolute) or by 7% (absolute).

The graphical results depicted represent actual results obtained by running test scenarios on user data maintained by an electronic retailer on a large number of users. In each of the depicted graphical results, the x-axis represents a number of item interaction events provided to generate a prediction. As depicted by the graphical results, the use of a temporal ensemble (solid line) to improve an artificial neural network prediction model resulted in an increase to precision in a recommendation system that used a single neural network (dashed line) as the prediction model. Accordingly, embodiments of the disclosure provide for more accurate predictions than typical recommendation systems.

Execution Environment

Figure 5:
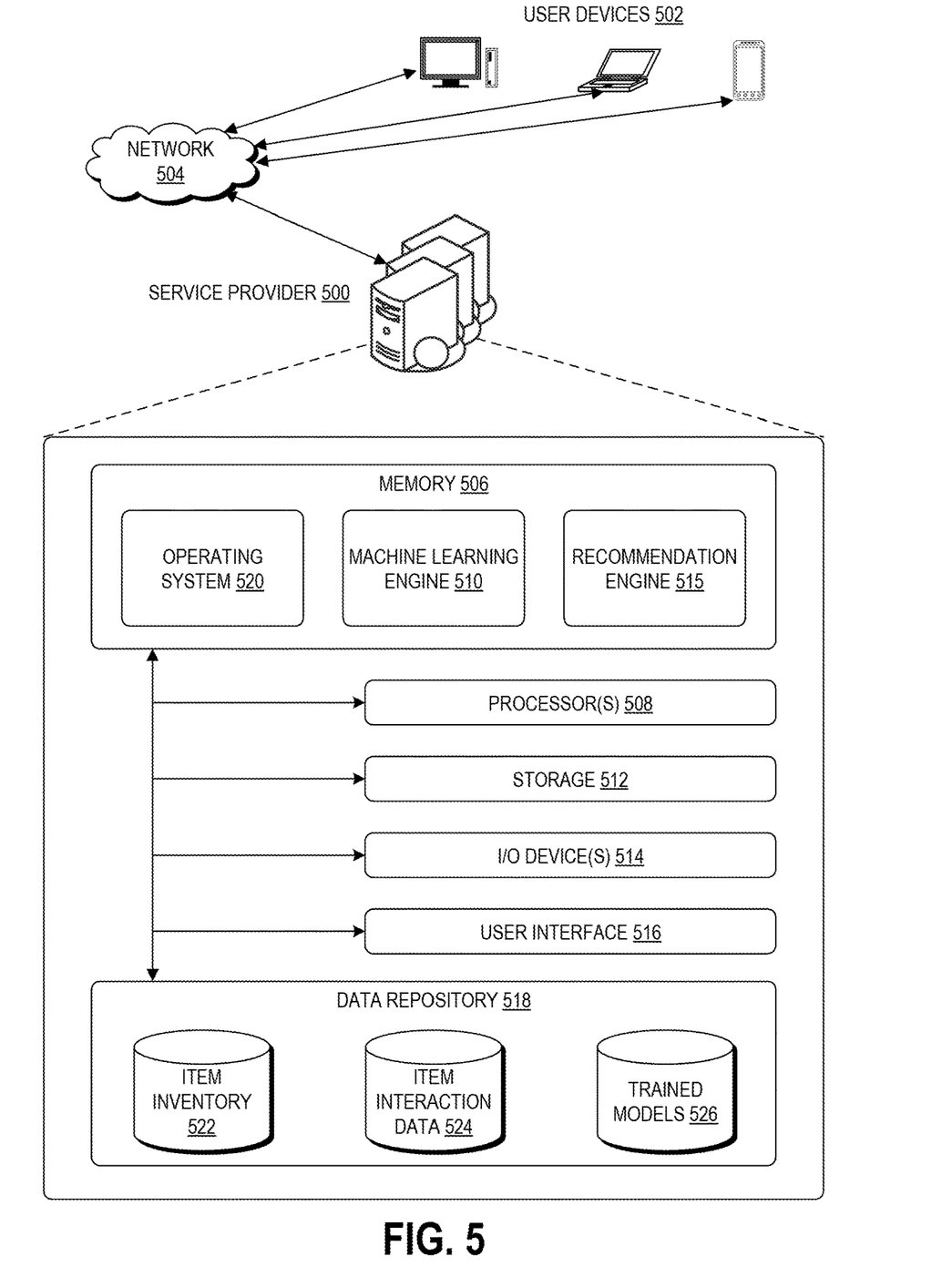
FIG. 5 is a block diagram of an illustrative computing system configured to implement training and processing of artificial neural networks.

FIG. 5 is a block diagram of an illustrative computing system configured to implement training and processing of artificial neural networks as described above. The architecture of the service provider 500 may include a memory 506 storing an operating system 520, machine learning engine 510, and recommendation engine 515, which can be in direct communication with one another or distributed among computing devices within a networked computing system and in communication with each other. Components used for the architecture may depend at least in part upon the type of network and/or environment selected.

The service provider 500 may include one or more computers, perhaps arranged in a cluster of servers or as a server farm. The memory and processors that make up these computers may be located within one computer or distributed throughout many computers as detailed herein. These servers may be configured to train temporal model ensembles and manage recommendations. For example, the service provider 500 may be configured to manage recommendations offered in connection with an electronic marketplace.

The service provider 500 may include at least one memory 506 and one or more processing units (or processor(s)) 508. The memory 506 may include more than one memory and may be distributed throughout the service provider 500. The memory 506 may store program instructions that are loadable and executable on the processor(s) 508 as well as data generated during the execution of these programs. Depending on the configuration and type of memory, the memory 506 may be volatile (such as random access memory (RAM)) and/or non-volatile (such as read-only memory (ROM), flash memory, or other memory). In some examples, the memory 506 may include multiple different types of memory, such as static random access memory (SRAM), dynamic random access memory (DRAM), or ROM. The memory can store the program instructions as a number of modules that configure processor(s) 508 to perform the various functions described herein, for example operating system 520, machine learning engine 510, and recommendation engine 515.

The memory 506 may include operating system 520 for interacting with the service provider 500.

The machine learning engine 510 may be configured to implement the training shown and described with respect to FIGS. 1, 2, 3A, and 3B, and as such can be configured to manage item interaction data splits and train a number of temporally-distinct neural networks or other prediction models. The recommendation engine 515 can be configured to implement temporal ensembles of prediction models generated by the machine learning engine 510 to provide recommendations or predictions, for example to users of an electronic commerce system.

The processor 508 may include one or more general purpose computers, dedicated microprocessors, graphics processors, or other processing devices capable of communicating electronic information and/or training complex machine learning models. Examples of the processor 508 include one or more application-specific integrated circuits (ASICs), field programmable gate arrays (FPGAs), digital signal processors (DSPs) and any other suitable specific or general purpose processors. Some embodiments can use one or more graphical processing units (GPUs) as processor(s) 508 for training of the machine learning models, for example with machine learning engine 510. For example, the described neural network training can require heavy computation for metrics multiplication, and a GPU or similar processor having thousands of cores capable of parallel computing can be capable of performing daily training of a neural network, for example using a massive user-item interaction database as described herein. Computer-executable instruction, software or firmware implementations of the processor may include computer-executable or machine-executable instructions written in any suitable programming language to perform the various functions described. The processor 508 may be implemented as appropriate in hardware, firmware, or combinations thereof with computer-executable instructions and/or software. Computer-executable instructions and software may include computer-executable or machine-executable instructions written in any suitable programming language to perform the various functions described.

In some examples, the service provider 500 may also include additional storage 512, which may include removable storage and/or non-removable storage. The additional storage 512 may include, but is not limited to, magnetic storage, optical disks, and/or tape storage. The disk drives and their associated computer-readable media may provide non-volatile storage of computer-readable instructions, data structures, program modules, and other data for the computing devices. The memory 506 and the additional storage 512, both removable and non-removable, are examples of computer-readable storage media. For example, computer-readable storage media may include volatile or non-volatile, removable, or non-removable media implemented in any suitable method or technology for storage of information such as computer-readable instructions, data structures, program modules, or other data. As used herein, modules, engines, and components, may refer to programming modules executed by computing systems (e.g., processors) that are part of the architecture. The service provider 500 may also include input/output (I/O) device(s) and/or ports 514, such as for enabling connection with a keyboard, a mouse, a pen, a voice input device, a touch input device, a display, speakers, a printer, or other I/O device.

The service provider 500 may also include a user interface 516. The user interface 516 may be utilized by a user to access portions of the service provider 500. In some examples, the user interface 516 may include a graphical user interface, web-based applications, programmatic interfaces such as application programming interfaces (APIs), or other user interface configurations. The user interface 516 can include displays of the recommendations described herein.

The service provider 500 may also include a data store 518. In some examples, the data store 518 may include one or more data stores, databases, data structures, or the like for storing and/or retaining information associated with the service provider 500. Thus, the data store 518 may include data structures, such as an item inventory database 522, item interaction data repository 524, and trained models data repository 526.

The item inventory database 522 may be used to retain information about items available within the service provider 500. As described above, items can include physical and/or digital products available for purchase in an electronic marketplace. In other embodiments items can include advertisements, web pages, and other digital content. The item inventory database 522 may be updated as the selection of available items changes over time. The item interaction data repository 524 can store logged user behaviors with respect to the items currently and/or previously in the item inventory database. The trained models data repository 526 can include a number of machine learning models trained as described herein.

The service provider 500 can communicate over network 504 with user devices 502. The network 504 can include any appropriate network, including an intranet, the Internet, a cellular network, a local area network or any other such network or combination thereof. User devices 502 can include any network-equipped computing device, for example desktop computers, laptops, smartphones, tablets, e-readers, gaming consoles, and the like. Users can access the service provider 500 and interact with items therein via the network 504 and can be provided with recommendations via the network 504.

Terminology

Depending on the embodiment, certain acts, events, or functions of any of the processes or algorithms described herein can be performed in a different sequence, can be added, merged, or left out altogether (e.g., not all described operations or events are necessary for the practice of the algorithm). Moreover, in certain embodiments, operations or events can be performed concurrently, e.g., through multi-threaded processing, interrupt processing, or multiple processors or processor cores or on other parallel architectures, rather than sequentially.

The various illustrative logical blocks, modules, routines, and algorithm steps described in connection with the embodiments disclosed herein can be implemented as electronic hardware, or combinations of electronic hardware and computer software. To clearly illustrate this interchangeability, various illustrative components, blocks, modules, and steps have been described above generally in terms of their functionality. Whether such functionality is implemented as hardware, or as software that runs on hardware, depends upon the particular application and design constraints imposed on the overall system. The described functionality can be implemented in varying ways for each particular application, but such implementation decisions should not be interpreted as causing a departure from the scope of the disclosure.

Moreover, the various illustrative logical blocks and modules described in connection with the embodiments disclosed herein can be implemented or performed by a machine, such as a general purpose processor device, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor device can be a microprocessor, but in the alternative, the processor device can be a controller, microcontroller, or state machine, combinations of the same, or the like. A processor device can include electrical circuitry configured to process computer-executable instructions. In another embodiment, a processor device includes an FPGA or other programmable device that performs logic operations without processing computer-executable instructions. A processor device can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor device may also include primarily analog components. For example, some or all of the algorithms described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

The elements of a method, process, routine, or algorithm described in connection with the embodiments disclosed herein can be embodied directly in hardware, in a software module executed by a processor device, or in a combination of the two. A software module can reside in RAM memory, flash memory, ROM memory, EPROM memory, EEPROM memory, registers, hard disk, a removable disk, a CD-ROM, or any other form of a non-transitory computer-readable storage medium. An exemplary storage medium can be coupled to the processor device such that the processor device can read information from, and write information to, the storage medium. In the alternative, the storage medium can be integral to the processor device. The processor device and the storage medium can reside in an ASIC. The ASIC can reside in a user terminal. In the alternative, the processor device and the storage medium can reside as discrete components in a user terminal.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without other input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

While the above detailed description has shown, described, and pointed out novel features as applied to various embodiments, it can be understood that various omissions, substitutions, and changes in the form and details of the devices or algorithms illustrated can be made without departing from the spirit of the disclosure. As can be recognized, certain embodiments described herein can be embodied within a form that does not provide all of the features and benefits set forth herein, as some features can be used or practiced separately from others. The scope of certain embodiments disclosed herein is indicated by the appended claims rather than by the foregoing description. All changes which come within the meaning and range of equivalency of the claims are to be embraced within their scope.

What is claimed is:

1. A system comprising:
   a computer-readable memory storing executable instructions; and
   one or more processors in communication with the computer-readable memory, wherein the one or more processors are programmed by the executable instructions to at least:
   generate a temporal ensemble comprising a plurality of neural networks, wherein the one or more processors are programmed by the executable instructions to at least, for each neural network in the temporal ensemble:
   for each of a plurality of users of an electronic catalog, obtain training data representing a plurality of items purchased by the respective user from the electronic catalog during a predetermined timeframe;
   divide the training data into an input group and an expected output group, the input group including a less recent subset of the plurality of items purchased between a beginning of the predetermined timeframe and a data split date, the expected output group including a more recent subset of the plurality of items purchased between the data split date and an end of the predetermined timeframe; and
   train the neural network to predict the expected output group based on the input group;
   wherein the predetermined timeframe of the training data is different for each neural network in the temporal ensemble such that an item purchase event is included in the input group to train a first neural network of the temporal ensemble and is included in the expected output group to train a second neural network of the temporal ensemble, and each neural network in the temporal ensemble is trained during a different respective time interval;
   obtain a list of the plurality of items purchased by a user;
   provide the list to the temporal ensemble, wherein each neural network outputs a corresponding set of item-specific scores;
   combine the scores output by each of the neural networks in the temporal ensemble; and
   select items to recommend to the user based at least partly on the combined scores.

2. The system of claim 1, wherein the time intervals do not overlap.

3. The system of claim 1, wherein:
   each neural network of the plurality of neural networks comprises at least an input layer, a hidden layer, and an output layer, and
   to train each neural network, the one or more processors are programmed by the executable instructions to at least provide the input group to the input layer and provide the expected output group to the output layer.

4. The system of claim 3, wherein, to provide the list to the temporal ensemble, the one or more processors are programmed by the executable instructions to at least provide the list as a second set of inputs to the input layer of each neural network in the temporal ensemble.

5. A method, comprising
   training a first neural network during a first time period with a first dataset of user-specific item interaction histories that extend to a first end date, wherein training the first neural network comprises dividing the first dataset into an input set and an expected output set based on a first split date;
   during a second time period falling after the first time period, training a second neural network with a second dataset of user-specific item interaction histories that extend to a second end date that is later than the first end date, wherein training the second neural network comprises dividing the second dataset into an input set and an expected output set based on a second split date that is later than the first split date, wherein the first dataset and second dataset overlap, and are divided such that an item interaction event is included in the input set to train the first neural network and is included in the expected output set to train the second neural network;
   combining at least the first and second trained neural networks into a prediction model; and
   generating personalized recommendations of items for users based on the prediction model;
   the method performed under control of program code executed by one or more computer processors.

6. The method of claim 5, wherein the item interaction event is an item purchase.

7. The method of claim 5, wherein less weight is given to the first neural network than the second neural network in generating recommendations.

8. The method of claim 5, wherein generating recommendations for a user comprises:
   obtaining a list of catalog items purchased by the user;
   providing the list to at least the first and second trained neural networks, wherein each neural network outputs a corresponding set of item-specific scores;
   combining the scores output by at least the first and second neural networks; and
   selecting items to recommend to the user based at least partly on the combined scores.

9. The method of claim 5, wherein training of the first neural network is completed prior to the end date of the second dataset.

10. A recommendation system, comprising:
- a computing system comprising one or more processors, the computing system programmed to implement:
  - a first neural network trained with a first dataset of user-item interaction event data corresponding to a first time period; and
  - a second neural network trained with a second dataset of user-item interaction event data corresponding to a second time period that overlaps with the first time period such that a user-item interaction event appears in both the first dataset and the second dataset;
- wherein the first neural network is trained with the user-item interaction event provided in an input group but not in an expected output group, and the second neural network is trained with the user-item interaction event provided in an expected output group but not in an input group;
- wherein the computing system is further programmed to use at least the first and second neural networks in combination to generate item recommendations for a user based on a record of user-item interactions of the user.

11. The recommendation system of claim 10, wherein the computing system, in generating the item recommendations, is programmed to provide the record of user-item interactions to each of the first neural network and the second neural network.

12. The recommendation system of claim 10, wherein the user-item interaction event is an item purchase event.

* * * * *